Feb. 23, 1960 J. L. ROGERS 2,926,342
MAGNETIC MEMORY DEVICE
Filed July 31, 1957 2 Sheets-Sheet 1

INVENTOR
J. L. ROGERS
BY [signature]
ATTORNEY

Feb. 23, 1960

J. L. ROGERS

MAGNETIC MEMORY DEVICE 2,926,342

Filed July 31, 1957

2 Sheets-Sheet 2

INVENTOR
J. L. ROGERS

BY

ATTORNEY 2,926,342

MAGNETIC MEMORY DEVICE

John L. Rogers, Morristown, N.J., assignor to Bell Telephone Laboratories, Incorporated, New York, N.Y., a corporation of New York Application July 31, 1957, Serial No. 675,388

9 Claims. (Cl. 340—174)

Figure 1:
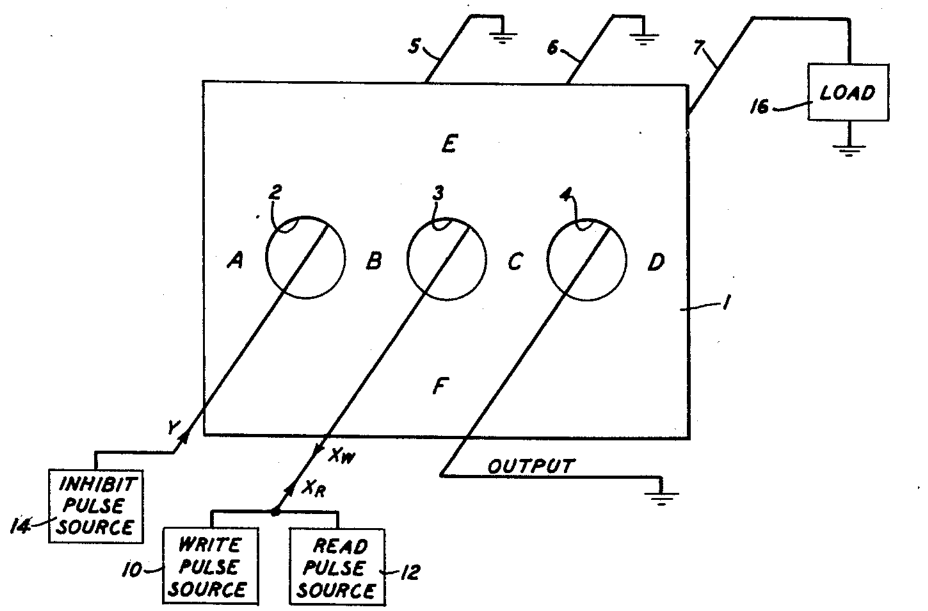

This invention relates to storage or memory devices and circuits and more particularly to such devices and circuits employing magnetic memory elements.

A type of magnetic device receiving wide usage heretofore in magnetic memory matrices is the toroidal core composed of a material having a substantially rectangular hysteresis loop. Such an element has the capacity of storing binary information by maintaining a remanent magnetization in one or the other of two possible states. These devices have commonly been employed with circuitry utilizing coincident current switching techniques. Such techniques employ cores having two or more drive windings where switching is accomplished by applying currents to all of the drive windings simultaneously.

In such a system it has been found that critical limitations apply to the drive currents. The sum of the magnetomotive forces from the currents applied to the core desired to be switched must be adequate to switch the core while the current through other cores connected in series with one or the other of the coincident current windings must be below the value necessary to switch those cores. Furthermore, switching can be accomplished more rapidly by driving a core with current greater than the minimum value necessary to accomplish switching. However, because the current in any winding must be below the value which will switch an idle core, it has not been possible to reduce core switching time by providing any substantial overdrive to the core windings.

This problem is further complicated by the adverse effects of temperature variation on the permissible maximum and minimum values of the drive currents applied to the separate windings of coincident current magnetic cores known in the art. Changes of temperature produce variations in the amount of drive required to switch a given core. To permit the operation of coincident current magnetic core circuits over normally encountered temperature ranges has required a decrease in the allowable excursion from a particular design value of drive current with attendant increases in production costs and decreased flexibility of any given design.

One attempt to obviate the limitation upon the value of drive currents, while improving the switching time of a magnetic core, is disclosed in an article by L. P. Hunter and E. W. Bauer entitled "High Speed Coincident-Flux Magnetic Storage Principles" appearing on page 1257 in the Journal of Applied Physics, volume 27, No. 11, November 1956. This article describes a core having a singled drive hole and a separate sense hole in the otherwise conventional toroidal arrangement which employs coincident flux rather than coincident current for a storage of information in the memory element.

What I propose is a further improvement over the coincident current type of core in which an inhibited flux storage system is employed to accomplish increased switching speed with an attendant simplification of fabrication techniques and a freedom from the aforementioned drive current limitation.

It is therefore a general object of my invention to provide an improved magnetic memory device.

A further object of my invention is the provision of a magnetic memory element permitting a simplification of fabrication techniques.

A still further object of my invention is the minimization of disturbance effects at non-selected elements of a magnetic element storage matrix.

Other objects of my invention are the provision of a magnetic memory element permitting increased speed in element switching and the elimination of critical restrictions on the values of drive currents.

These and other objects of my invention are achieved in a specific illustrative embodiment thereof in which a single element is formed of a magnetic material having a substantially rectangular hysteresis loop in a shape essentially rectangular with three equally spaced apertures placed in a row to define four flux legs in the device. Each aperture has a single wire conductor threaded through it. The wire through the center aperture may be designated a main drive lead and the wire through one of the adjacent apertures is an auxiliary drive lead. The wire through the remaining aperture is an output lead. Reversal of the flux linking the output lead, and thereby the production of a signal on that lead, is accomplished by the application of a particular current pulse on the main drive lead in the absence of an inhibit pulse on the auxiliary drive lead.

The flux lines which follow a magnetic path completely surrounding an aperture are considered to link the conductor passing through the aperture. In contradistinction, the flux lines passing adjacent to, but not surrounding, an aperture do not link that aperture and thus have no effect on the conductor threading it.

In the operation of such an element in one specific embodiment of my invention, main drive pulses of a particular polarity are employed to store a binary "1" in the device. The simultaneous presence of an inhibit pulse on the auxiliary drive lead with such a main drive pulse prevents the storage of a binary "1" and is equivalent to storing a binary "0" in the device. Readout of the stored information is accomplished by the application of a main drive pulse of the opposite polarity to reverse the direction of the flux linking the output lead in the event a binary "1" had been stored. Thus, readout of the previous storage of a binary "1" is evidenced by the appearance of a pulse on the output lead while the previous storage of a binary "0" is evidenced by no signal thereon. An output signal occurs only when the flux linking the output winding is reversed. Since an auxiliary drive pulse by itself does not affect this flux, the former limitation on the driving energy applied to switch an element is removed with a resulting possibility of greatly increased switching speed and independence of operating temperatures encountered by the element.

One important advantage of my invention becomes apparent in considering the fabrication of a plurality of the above described magnetic memory elements in a magnetic memory matrix. Individual matrix elements, each in accordance with my invention, may be formed of pierced magnetic sheets, as set forth in Patent 2,912,677, granted November 10, 1959, of R. L. Ashenhurst and R. C. Minnick, or may be formed by multiple layers of etched members, as set forth in application Serial No. 455,658, filed September 13, 1954, and now abandoned, of R. C. Minnick, or in other ways known to those skilled in the art. Advantageously, in one illustrative matrix embodying my invention the elements may be formed on a sheet of magnetic material with suitable isolation provided between the separate elements.

Each aperture in any element of such a matrix need only be threaded by a single conductor and such individual conductors may be deposited by evaporation or printing techniques as is known in the art. Since each conductor would go alternately over and under the matrix through adjacent memory elements there is never any crossing of conductors on the same side of the matrix and hence no necessity for insulating the conductors from each other. With properly sized holes in the elements it is possible to successfully evaporate the conducting layers into these holes in thin sheets of magnetic material. Hence the advantage of only one conductor per hole is fully realized in utilizing evaporating or printing techniques to achieve minimum size for a given magnetic memory matrix.

It is a feature of my invention that a magnetic memory element have three aligned apertures therein defining four flux path legs of substantially equal size and that individual conductors thread each of these apertures. Specifically in accordance with my invention the center conductor has applied thereto both the reading and writing pulse currents for determining the state of magnetization of the memory element; the one outer conductor has an inhibit pulse current applied thereto for controlling whether a "1" or a "0" is stored in the memory element; and the other outer conductor is connected to the load.

It is another feature of my invention that the flux paths in the memory element are such that the direction of the linking adjacent the output conductor is not materially affected by pulses applied only to the inhibit conductor.

It is a further feature of this invention that such memory elements are arranged in a word organized memory matrix wherein drive pulses are only applied to the center aperture conductor when it is desired to store or determine the state of magnetization of the element but the auxiliary drive or inhibit pulses are applied to all the elements of a column, including elements whose state of magnetization is not to be changed. However, in accordance with my invention the application of a pulse to the inhibit or auxiliary drive lead alone does not cause any material change in the flux linking the output lead.

Figure 2A:
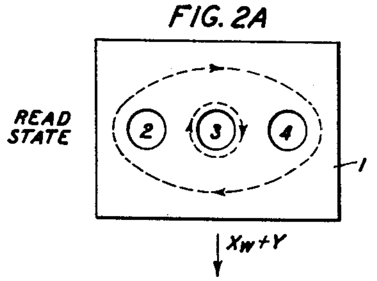
Figure 2B:
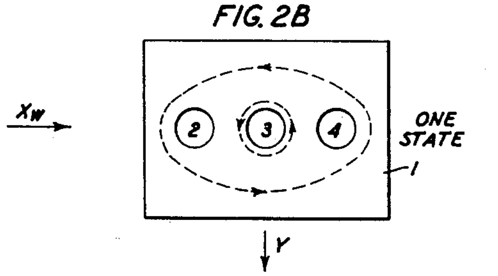
Figure 2C:
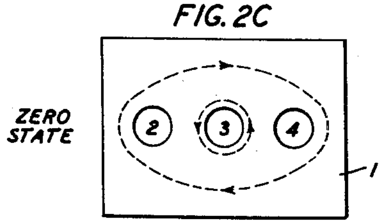
Figure 2D:
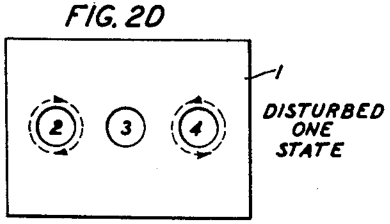
Figure 3:
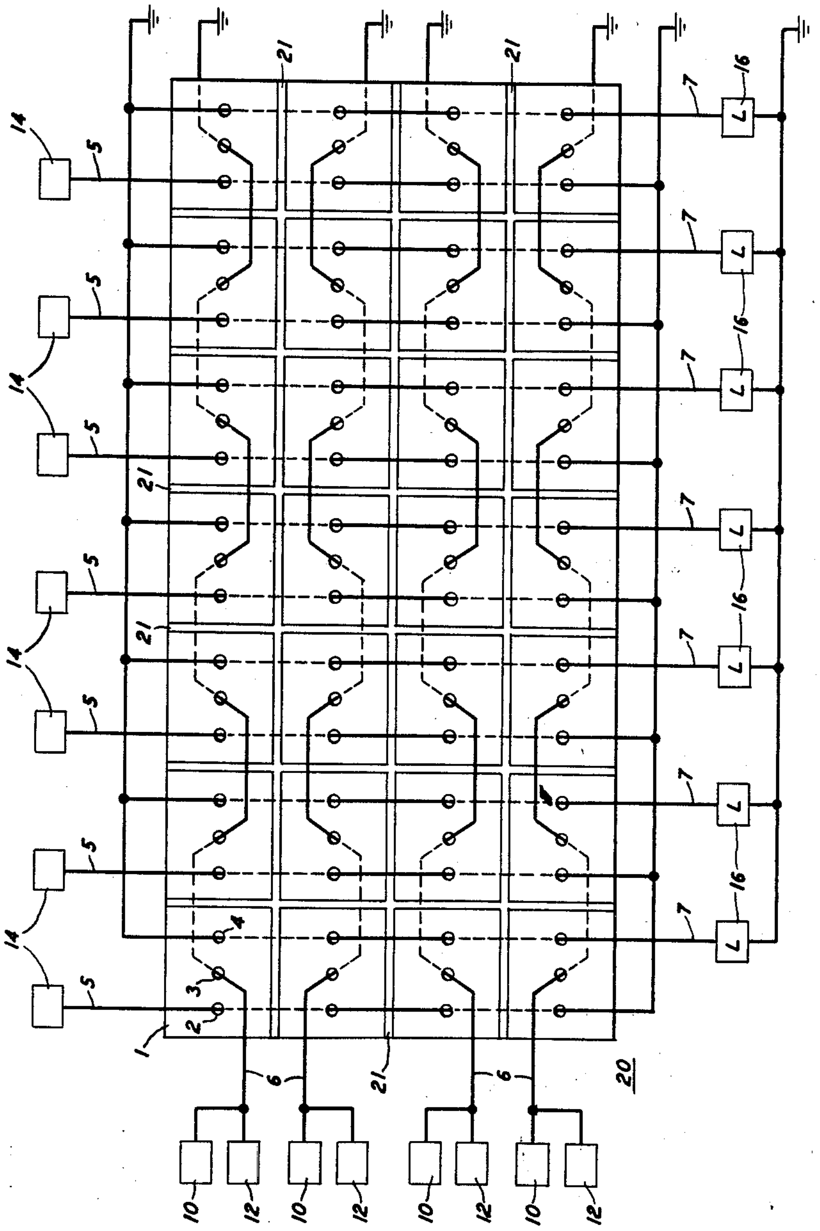

A complete understanding of this invention and of these and various other features thereof may be gained from a consideration of the following detailed description together with the accompanying drawing, in which:

Fig. 1 depicts a single magnetic memory element in accordance with one specific embodiment of my invention;

Figs. 2A, 2B, 2C and 2D depict schematically the flux configurations resulting from various combinations or subcombinations of drive pulses employed in one specific embodiment of my invention; and Fig. 3 is a schematic representation of a word organized memory matrix in accordance with a specific illustrative embodiment of my invention and incorporating the individual magnetic memory elements of Fig. 1.

In Fig. 1 is shown a magnetic memory element 1 having apertures 2, 3 and 4 of essentially equal size and equally spaced in a row to define flux legs A, B, C and D of substantially equal size and flux connecting sections E and F advantageously of a lateral width greater than twice that of the flux legs. Through apertures 2, 3 and 4 are threaded leads 5, 6 and 7, respectively, lead 5 being the auxiliary drive lead, lead 6 the main drive lead and lead 7 the output lead. Lead 5 may have applied to it current pulses Y from an associated pulse source 14 to produce a current in the direction indicated by the arrow. Pulses $X_W$ or $X_R$ will be applied to lead 6 from associated pulse sources 10 or 12, respectively, to produce currents in the directions shown by the respective arrows. $X_W$ is a write pulse and may or may not be accompanied by the application of a pulse Y. $X_R$ is a read pulse and is applied alone to sense the storage state of the magnetic element. Output signals appear on lead 7 when the flux linking output lead 7 is reversed and are applied to an associated load 16.

The advantages of magnetic memory elements in accordance with my invention wherein large driving currents may be applied to lead 6 to reduce the switching time and wherein disturbance pulses appearing on lead 5 due to pulses being applied to other cores in a matrix can have substantially no effect on the information storage state of a non-selected memory element can best be seen by considering the various possible magnetic flux conditions for the element and in particular, for the individual flux legs A, B, C and D. This can be seen from a consideration of the various flux plots of Fig. 2 and the following detailed discussion.

Figs. 2A, 2B, 2C and 2D depict the same magnetic element 1 with apertures 2, 3 and 4 as depicted in Fig. 1. However, in the interest of simplicity leads 5, 6 and 7 have been omitted. Fig. 2A shows the flux directions corresponding to the read state of the device immediately after the application of a read pulse $X_R$. It should be noted that the flux surrounding aperture 4 is in a clockwise direction. The application of a write pulse $X_W$ alone produces the flux configuration appearing in Fig. 2B in which the flux surrounding the aperture 4 has been reversed. This flux reversal of the flux surrounding aperture 4 induces a pulse on the output conductor 7. However, this pulse is of the wrong polarity to be effective as an output pulse for the load 16 and, if desired, the load may be isolated from the memory element during this time by the inclusion of a diode or other unidirectional conducting element, as is known in the art. It can be seen that the subsequent application of a pulse $X_R$ would return the device to the configuration depicted in Fig. 2A with a further reversal of the flux surrounding aperture 4, thereby producing a signal pulse on the output lead through this aperture.

The application of a pulse $X_R$ from read pulse source 12 followed by a pulse $X_W$ alone from write pulse source 10 and then a second pulse from the read pulse source illustrates the storing and reading out of a stored "1" in the memory element.

From the read state of Fig. 2A a "0" is stored in the memory element by the simultaneous application of pulses $X_W$ and Y on their respective leads. An $X_W$ pulse produces a magenetomotive force tending to establish flux in a counterclockwise direction while a Y pulse produces a magnetomotive force tending to establish a clockwise magnetic flux. The concurrence of the two pulses acting on the circuit having the flux configuration of Fig. 2A produces the configuration depicted in Fig. 2C in which the direction of flux surrounding the aperture 4 has not been changed from its direction in the read state depicted in Fig. 2A. Thus the subsequent application of a read pulse $X_R$ to the zero state configuration of Fig. 2C would not result in any signal on the output lead.

On the other hand, the application of a sole Y pulse to the circuit having the flux configuration of Fig. 2B produces the configuration of Fig. 2D in which the flux surrounding aperture 4 is not reversed. It is merely routed through leg C rather than leg A.

By applying drive pulses to lead 6 with or without the simultaneous application of inhibit or auxiliary drive pulses to lead 5 the binary states "0" and "1" may be stored in the memory element. When such elements are arranged in matrices, however, and as further discussed below with reference to Fig. 3, disturbance pulses occur at non-selected cores. In a word organized memory of the type in which memory elements in accordance with my invention may be advantageously employed, the lead 6 may thread all the center apertures of a row of memory elements in which a word is stored and which are all to be selected at the same time. However, the auxiliary drive conductor 5 will thread a column of such memory elements only one of which is to be selected at any given time. Accordingly, it is of major concern to determine the disturbance effect on information stored in a non-related core due to the application of the coincident pulse from source 14 on lead 5 when a drive pulse is not applied on the lead 6 threading that particular core.

Accordingly we should determine the effect of a disturbance due to a pulse Y applied when the memory element is either in the zero state of Fig. 2C or the one state of Fig. 2B. In accordance with an aspect of my invention the application of a pulse Y to a non-selected core cannot reverse the flux linking the output conductor and accordingly has no effect on the stored state of that core or on any output pulse that may or may not be applied by the selected core to the output conductor 7.

As the direction of flux due to the Y pulse alone is the same as the direction of the flux around the aperture 2 when a "0" has been stored, Fig. 2C, the further application of Y pulses does not change the flux pattern.

The application of further Y pulses to the "1" state configuration of Fig. 2B produces a change to what may be considered the disturbed "1" state which is depicted in Fig. 2D. However, as can be seen there is no reversal of the flux surrounding the aperture 4 from that shown in Fig. 2B and, therefore, no difference in the output signal resulting from the application of a read pulse $X_R$ to either the "1" state of Fig. 2B or the disturbed "1" state of Fig. 2B.

Accordingly, in accordance with aspects of my invention, a non-selected core may be pulsed any number of times by the coincident auxiliary or inhibit pulse applied to a selected core without having any effect on the information stored in the non-selected core or the output pulse to be derived therefrom when that core is itself read out. Accordingly by the novel arrangement of my invention the application of the disturbance pulse to a core does not cause output signals from that core to be difficult or impossible of determination by the load circuitry.

Fig. 3 depicts a specific embodiment of my invention wherein a plurality of the memory elements depicted in Fig. 1 are arranged to form a word organized matrix or array 20. Each word consists of a horizontal row of magnetic elements 1 with a main drive lead 6 threaded through the center aperture 3 of each magnetic element. Main drive pulses are applied to each lead 6 from the associated main drive pulse source 10 or 12. Magnetic elements 1 in each vertical column have their apertures 2 threaded in series by a single auxiliary drive lead 5 carrying pulses from its associated auxiliary pulse source 14. Similarly, the magnetic elements 1 in each vertical column have their apertures 4 threaded in series by a single output lead 7 connected to an associated load device 16. Magnetic isolation between adajcent magnetic elements 1 may be provided by separating strips 21 of non-magnetic material or by slots between adjacent elements. The matrix may be fabricated, for example, in accordance with the procedure detailed in "Three-Dimensional Printed Wiring" by E. A. Guditz, pages 161–163, Electronics, June 1, 1957. The memory matrix 20 depicted in Fig. 3, which may be considered a small matrix in itself or a section of a larger matrix, serves to point out another outstanding advantage of my invention, namely, the the matrix may utilize a configuration of conductors in which no two wires cross each other on the same side of the matrix sheet. In Fig. 3, the solid lines representing conductors indicate wires in full view on the near side of the matrix while the dashed lines indicate conductors on the far side of the matrix. In can be seen that no two conductors ever cross on the same side of the matrix. Therefore, it should be apparent that such a matrix utilizing the specific embodiments of my invention can be readily fabricated by employing printing or evaporating techniques as are known in the art. These same techniques can deposit the conductor through the hole in the element where the hole is of the proper size. Satisfactory conducting layers have been successfully evaporated through .015 inch diameter holes in thin sheets of ferrite. It is evident, therefore, that utilization of specific embodiments of my invention in a magnetic memory matrix fabricated by the techniques mentioned permits the inclusion of a large number of elements of very small size within a minimum space thereby reducing the switching power requirements and achieving other advantages of miniaturization.

It should be noted that in such a word organized matrix an auxiliary drive conductor 5 and an output conductor 7 are common to all the memory elements of a column, only one of which elements is selected in any instance. However, as described in detail above, the presence of repeated pulses on the conductor 5 threading a non-selected memory element has no effect on the information stored in that element. In such arrangements the main drive conductor 6 is only pulsed when it is desired to store or determine the state of magnetization of all the elements threaded by that conductor so that there can be no disturbance pulses or non-selected memory elements insofar as current pulses on conductor 6 are concerned.

In one specific illustrative embodiment of my invention the memory element 1 was of manganese-magnesium ferrite, 0.105 inch by 0.080 inch and 0.015 inch thick. The apertures 2, 3 and 4 each had a diameter of 0.015 inch, and the flux legs A, B, C and D at their narrowest points were each substantially 0.015 inch wide. Read and write pulses $X_R$ and $X_W$ were approximately 0.5 ampere and auxiliary drive or inhibit pulse Y was approximately 0.5 ampere. The output pulse was approximately 0.10 volt.

It is to be understood that the above described arrangements are illustrative of the application of the principles of the invention. Numerous other arrangements may be devised by those skilled in the art without departing from the spirit and scope of the invention.

What is claimed is:

1. A magnetic core memory device comprising a magnetic element having a substantially rectangular hysteresis loop, four flux legs of substantially equal dimensions in said device delimited by three apertures arranged side by side and equally spaced in a row, a main drive lead through the center aperture, an auxiliary drive lead through one end aperture, an output lead through the other end aperture, means for applying current in one direction to said main drive lead to establish a particular polarity of magnetic flux linking said output lead in the absence of pulses of a particular polarity on said auxiliary lead, the existence of said particular polarity of magnetic flux linking said output lead corresponding to the storage of a binary digit in said memory device, means for applying pulses of said particular polarity to said auxiliary lead concurrently with the application of said current in one direction to said main drive lead to prevent said establishment of particular magnetic flux polarity linking said output lead, means for applying current to said main drive lead in a second direction to reverse the polarity of magnetic flux, if established, linking said output lead, and output means connected to said output lead.

2. A magnetic memory device comprising an element of a magnetic material having a plurality of connecting legs of substantially equal dimensions defining a series of apertures, said material exhibiting a substantially rectangular hysteresis loop, said legs serving as paths for magnetic flux, first electrical conducting means threading one of said apertures, second electrical conducting means threading a first adjacent aperture, third electrical conducting means threading a second adjacent aperture remote from said first adjacent aperture, main pulse means for applying pulses to said first electrical conducting means, auxiliary pulse means for applying pulses to said second electrical conducting means, said main pulse means causing a reversal of magnetic flux surrounding said second adjacent aperture in the absence of pulses from said auxiliary pulse means, said main and auxiliary pulse means acting concurrently to prevent the reversal of magnetic flux surrounding said second adjacent aperture, and output means connected to said third electrical conducting means.

3. A magnetic memory device comprising an element of a magnetic material exhibiting a substantially rectangular hysteresis loop, said element having a series of flux legs of substantially equal dimensions separated by a center and adjacent apertures, conducting means threading each of said apertures, first pulse means connected to said conducting means threading said center aperture, second pulse means connected to said conducting means threading one of said adjacent apertures, said first and second pulse means acting concurrently to establish a state of remanent magnetization corresponding to the storage of a first binary digit, said first pulse means acting alone to establish a state of remanent magnetization corresponding to a second binary digit, third pulse means connected to said center aperture conducting means to restore a predetermined state of remanent magnetization thereby producing an output signal on said conducting means threading the other of said adjacent apertures in the event of the prior storage of said second binary digit in said element, and output means connected to said conducting means threading said other adjacent aperture.

4. A magnetic memory device comprising an element of a magnetic material exhibiting a substantially rectangular hysteresis loop, said device including first, second, third and fourth flux-carrying legs of substantially equal dimensions, separated by first, second and third apertures in a row, electrical conducting means threading each of said apertures, first pulse means connected to said conducting means threading said first aperture on one end of said row, second pulse means connected to said conducting means threading said second aperture in the middle of said row, said second pulse means causing a reversal of magnetic flux surrounding said third aperture in the absence of pulses from said first pulse means, said first pulse means acting concurrently with said second pulse means to prevent a reversal of magnetic flux surrounding said third aperture, and output means connected to said conducting means threading said third aperture.

5. A magnetic memory device as set forth in claim 4 further including a flux path connecting all of said flux-carrying legs, said flux path having a lateral dimension in excess of twice the lateral dimension of each said flux-carrying leg.

6. A magnetic memory device comprising a magnetic element having four flux legs separated by three substantially equally spaced apertures situated in a row, said element being of a material having a substantially rectangular hysteresis loop, a plurality of conducting means threading said apertures, means for applying current in a particular direction to the conducting means threading the center aperture to establish a particular direction of magnetic flux linking one end aperture conducting means in the absence of current in said conducting means threading the other end aperture, means for applying current to said conducting means threading said other end aperture simultaneously with the application of current to said center aperture conducting means to prevent the establishment of said particular direction of magnetic flux linking said one end aperture conducting means, means for applying current in an opposite direction to said center aperture conducting means to reverse said particular direction of magnetic flux linking said one end aperture conducting means, if established, and output means connected to said one end aperture conducting means.

7. A magnetic core memory device comprising a magnetic element having a substantially rectangular hysteresis loop and having three apertures therein, said apertures being positioned in a row and defining a plurality of magnetic paths around said apertures, an inhibit winding threading a first aperture at one end of said row, a sensing winding threading the middle aperture in said row, means for applying a pulse of one polarity to said sensing winding of sufficient magnitude to determine the flux direction in the paths around said middle aperture and around said row of apertures in one direction to store a first binary value, means for applying an inhibit pulse to said inhibit winding coincidentally with said pulse of one polarity to prevent switching of the direction of magnetic flux in the path around all of said apertures while aiding the switching of the direction of magnetic flux in the path around said middle aperture to store a second binary value, means for applying a pulse of opposite polarity to said sensing winding to determine the flux direction in said paths around said row of apertures and around said middle aperture in the opposite direction to read out information stored in the memory device, and an output winding threaded through the aperture at the opposite end of said row and responsive to change of direction of flux in the path around said row of apertures or around said aperture at the opposite end of said row for generating an output signal on occurrence of said pulse of opposite polarity on said sensing wire.

8. A word organized magnetic memory matrix comprising a plurality of magnetic elements of a substantially rectangular hysteresis loop material, each of said elements having three substantially equal apertures therein aligned in a row and defining four substantially equal flux legs, said elements being arranged in rows and columns, a main drive conductor threading each of the central apertures of the elements in each row, an auxiliary drive conductor threading one end aperture of the elements in each column, an output conductor threading the other end aperture of said elements in each column, means for applying drive pulses of one polarity to said main drive conductors to store one binary value in said elements, means for applying inhibit pulses to said auxiliary drive conductors coincident with said pulses applied to said main drive conductors to effect storage of the other binary value in said elements, means for applying pulses of opposite polarity to said main drive conductors to read out the binary value stored in said elements, and load means connected to said output conductors.

9. A word organized magnetic memory matrix in accordance with claim 8 wherein said main drive conductors extending along said rows and said auxiliary drive and output conductors extending along said columns alternately are on opposite sides of said elements so that said row conductors and said column conductors at no points cross each other on the same side of one of said elements.

References Cited in the file of this patent

UNITED STATES PATENTS 2,733,424 Chen ---------------- Jan. 31, 1956
2,784,391 Rajchman -------------- Mar. 5, 1957

OTHER REFERENCES

Publication I: An article entitled "The Transfluxor" by J. A. Rajchman and A. W. Lo published March 1956, "Proceedings of the IRE," vol. 44, Issue 3, pp. 321–332.